United States Patent [19]

Asano et al.

[11] Patent Number: 4,744,719

[45] Date of Patent: May 17, 1988

[54] CONTROL SYSTEM OF MULTI-JOINT ARM ROBOT APPARATUS

[75] Inventors: Kuniji Asano, Machida; Yoshiaki Arimura, Yokohama; Masao Obama, Yokosuka; Yutaka Hitomi; Mitsunori Kondoh, both of Yokohama, all of Japan

[73] Assignee: Tokyo Shibaura Denki Kabushiki Kaisha, Kawasaki, Japan

[21] Appl. No.: 45,192

[22] Filed: Apr. 30, 1987

Related U.S. Application Data

[63] Continuation of Ser. No. 545,275, Oct. 25, 1983, abandoned.

[30] Foreign Application Priority Data

| Oct. 29, 1982 [JP] | Japan | 57-189071 |
|---|---|---|
| Oct. 29, 1982 [JP] | Japan | 57-189072 |
| Oct. 29, 1982 [JP] | Japan | 57-189077 |
| Oct. 29, 1982 [JP] | Japan | 57-189083 |

[51] Int. Cl.$^4$ .......................... B25J 9/16; B25J 19/06
[52] U.S. Cl. ..................... 414/730; 318/568; 364/513; 901/9; 901/15; 901/47; 901/49
[58] Field of Search .................. 414/730; 901/2, 9, 10, 901/14, 15, 28, 44, 47, 49; 364/513; 318/568, 568 D

[56] References Cited

U.S. PATENT DOCUMENTS

| 4,160,508 | 7/1979 | Salisbury, Jr. | |
|---|---|---|---|
| 4,221,997 | 9/1980 | Flemming | |
| 4,308,584 | 12/1981 | Arai | 901/15 X |
| 4,311,556 | 1/1982 | Iwamoto et al. | 901/44 X |
| 4,332,989 | 6/1982 | Nicolaisen | 901/49 X |
| 4,338,672 | 7/1982 | Perzley et al. | 901/9 X |
| 4,348,731 | 9/1982 | Kogawa | 901/9 X |
| 4,480,495 | 11/1984 | Obama | 901/28 X |
| 4,663,726 | 5/1987 | Chand et al. | 901/2 X |

FOREIGN PATENT DOCUMENTS

| 0077609 | 4/1983 | European Pat. Off. | |
|---|---|---|---|
| 2045720 | 3/1979 | United Kingdom | |
| 682330 | 8/1979 | U.S.S.R. | 901/47 |

*Primary Examiner*—Robert J. Spar
*Assistant Examiner*—P. McCoy Smith
*Attorney, Agent, or Firm*—Oblon, Fisher, Spivak, McClelland & Maier

[57] ABSTRACT

A multi-joint arm robot apparatus comprises a multi-joint arm having a plurality of unit arms coupled in tandem with each other through joints, and a movable support for supporting the proximal portion of the multi-joint arm. The multi-joint arm robot apparatus has motors for controlling joint angles of the joints and a motor for moving the movable support. These motors are driven by a control system. The control system controls the motors to obtain proper joint angles, in such a way that the joints of the multi-joint arm are put into a given path when the movable support is moved a given unit distance.

3 Claims, 12 Drawing Sheets

CONTROL SYSTEM OF MULTI-JOINT ARM ROBOT APPARATUS

This application is a continuation of application Ser. No. 06/545,275, filed on Oct. 25, 1983, now abandoned.

BACKGROUND OF THE INVENTION

The present invention relates to a multi-joint arm control system for effectively guiding a multi-joint arm robot apparatus toward a target in a narrow space to which an operator cannot gain access.

Facilities such as tower tank, nuclear reactor, fusion reactor and shielding cell in a nuclear fuel reprocessing plant have neither entrance nor space large enough to allow technical personnel to enter or work in and contain harmful radioactive rays and the like. Therefore, it is usually impossible for personnel to enter directly inside these facilities to check them or work in them. With these facilities, it is necessary that the working person be located at a safe site and remotely operate an industrial robot arranged in these facilities or be allowed into them through a small entrance to check or work in them.

It is preferable that such a robot is of a multi-joint arm type wherein a plurality of unit arms are coupled through joints in order to facilitate the avoidance of contact with various obstacles.

A multi-joint arm which is simple in construction and easy in control is disclosed in U.S. patent application Ser. No. 418,208, U.S. Pat. No. 4,480,495, filed on Sept. 15, 1982. In this multi-joint arm, the angle formed by two adjacent arms connected by a joint is controlled by a motor, so that a relatively complex posture can be achieved. For this reason, this multi-joint arm has a suitable construction for avoiding obstacles, while being guided toward a target.

SUMMARY OF THE INVENTION

An object of the present invention is to provide a control system for a multi-joint arm robot apparatus which can easily and effectively guide a multi-joint arm to a target spot in a narrow space.

The multi-joint arm robot apparatus to which the control system of the present invention is applied comprises: a multi-joint arm having a plurality of unit arms coupled in tandem with each other through joints, and a movable support for supporting a proximal portion of the multi-joint arm and for moving the multi-joint arm as a whole. The multi-joint arm has motors for rotating the joints and encoders for detecting rotation angles of the joints to control joint angles of the joints. The movable support has a motor for moving the movable support and an encoder for detecting a rotating angle of the motor to control a displacement or travel distance of the support. The motors are driven by the control system.

According to a first embodiment of the present invention, the direction in which the leading end of the multi-joint arm is to move, and the distance to a target point in the direction are measured. In accordance with the measurement results the control system calculates an equation representing a path or track along which the multi-joint arm is to move, and such a joint angle of each of the joints that the joints are put into the path when the movable support is moved by a unit distance (feed pitch). Therefore, the control system drives the motors to move the movable support by the unit distance and set each joint angle to a calculated value.

According to a second embodiment of the present invention, a path of the multi-joint arm is determined in advance and the coordinates of a plurality of points on the path are found. The control system calculates an equation for representing the path of the multi-joint arm in accordance with the coordinates of these points. At the same time, the control system calculates such a joint angle of each of the joints that the joints are put into the path when the movable support moves by the unit distance. The motors of the multi-joint arm and the movable support are driven in the same manner as in the first embodiment.

According to a third embodiment of the present invention, the distance between the leading end of the multi-joint arm and a forward obstacle, and distances between the multi-joint arm and side obstacles are measured. The control system causes the multi-joint arm to move in a advancable direction for each step, in accordance with the distance information. When the joint is moved by one step, each joint is controlled to have the joint angle that the predecessor joint has had.

DETAILED DESCRIPTION OF THE PREFERRED EMBODIMENTS

Figure 1:
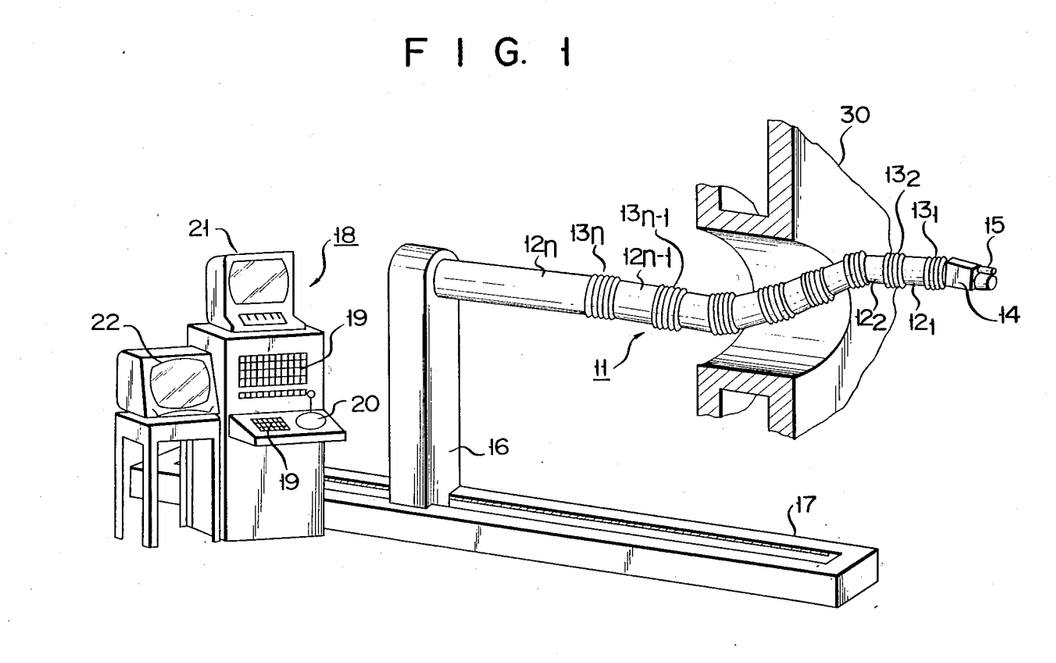
FIG. 1 shows the overall configuration of a multi-joint arm robot according to the present invention.

FIG. 1 shows the overall configuration of a multi-joint arm robot apparatus embodying the present invention. A multi-joint arm 11 comprises a plurality of unit arms $12_1$ to $12_n$, and joints $13_1$ to $13_n$ for coupling the unit arms $12_1$ to $12_n$ with each other in tandem. A TV camera 14 and a range finder 15 are attached at the forward end of leading unit arm $12_1$. The TV camera 14 is adapted for inspection, and measurement of the direction of a target. The range finder 15 measures the distance up to the target on the optical axis of the camera lens. The TV camera 14 is mounted such that the direction of the optical axis of the lens is freely changed by means of the joint $13_1$.

The unit arm $12_n$ of the multi-joint arm 11 is fixed on a support 16 which is movable by means of a motor, along a gear rail 17.

A control system 18 for controlling the operation of the multi-joint arm 11 mainly comprises a computer, in combination with an input/output device 19; a joystick 20 adapted for detection of coordinates of a target; a display 21; and a TV monitor 22 for reproducing an image picked up by the TV camera 14.

Each of the joints $13_1$ to $13_n$ has a driving mechanism (to be described later). The driving mechanisms are controlled by the control system, to change a respective joint angle $\theta$. In other words, a given unit arm can change its position with respect to the adjacent unit arm in a three-dimensional space. The multi-joint arm 11 moves along a desired path within a tank 30, when the movable support 16 and the joints $13_1$ to $13_n$ are driven by the control system 18.

Figure 2:
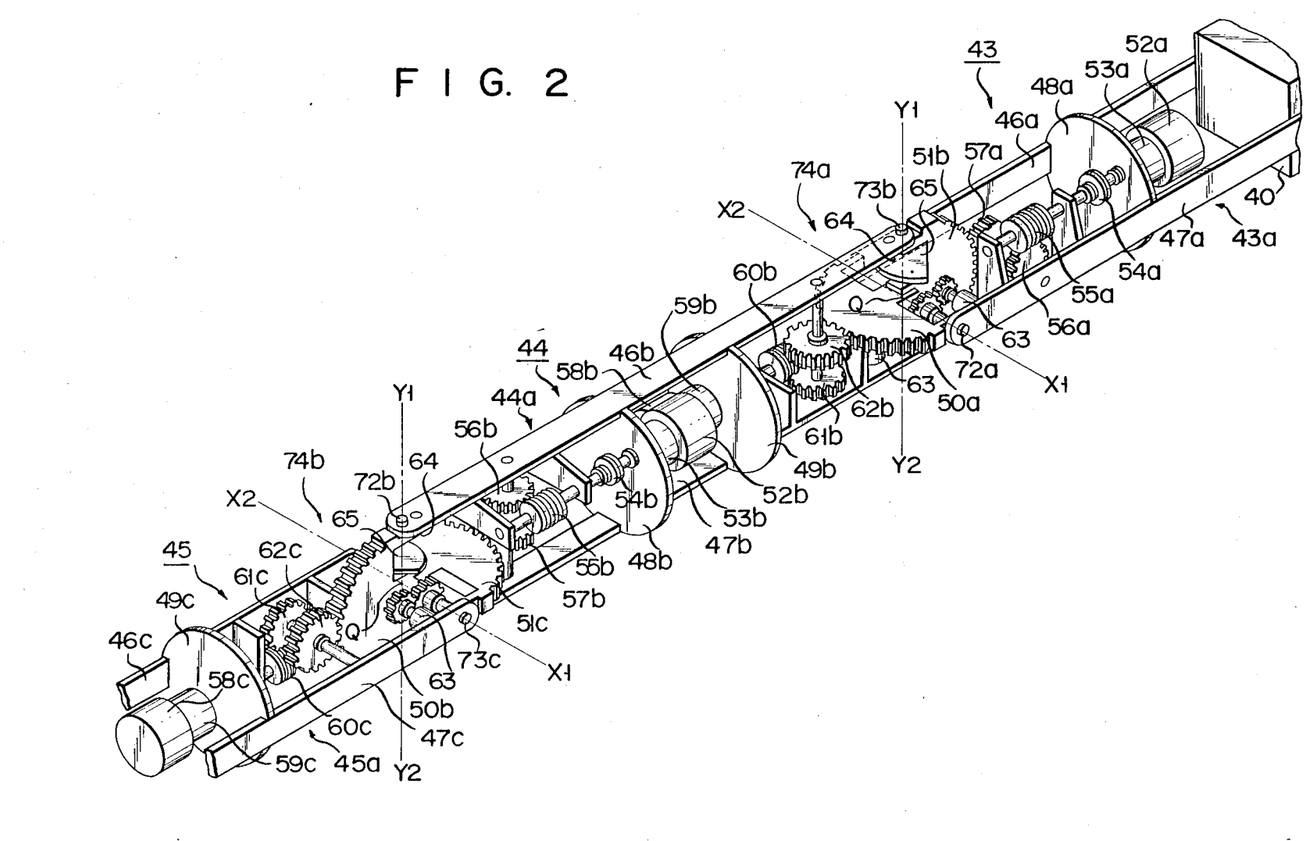
FIG. 2 shows an internal mechanism of a multi-joint arm.

FIG. 2 shows an example of a configuration of the multi-joint arm 11 disclosed in the patent application mentioned above. A plurality of arms 43, 44, 45 are connected by joint sections 74a, 74b, each joint section being arranged at one end of each of the arms. A support member 43a of the arm 43 consisting of an elongated support plate 46a, 47a and a support disc 48a is arranged on a base 40. A guide member 50a having a form like a symmetrically-divided spur wheel is rotatably attached to the foremost end of the elongated support plates 46a and 47a by pins 72a. In the case of the arm 44, a support member 44a includes two support discs 48b and 49b and two elongated support plates 46b and 47b fixed to the support discs 48b and 49b at the center thereof. A guide member 51b having a form like a symmetrically-divided spur wheel is rotatably attached to the back ends of the elongated support plates 46b and 47b by pins 73b. A guide member 51c is rotatably attached to the front ends of the elongated support plates 46b and 47b by pins 72b. Arm 45 has the same construction as arm 44, though arm 44 revolves 90 degrees around the longitudinal axis thereof. Specifically, elongated support plates 46b and 47b are arranged opposite to each other in the vertical direction in the arm 44, while elongated support plates 46c and 47c are arranged opposite to each other in the horizontal direction in the arm 45. The elongated support plates 46c, 47c of support member 45a are fixed to two support discs (only support disc 49c is shown in FIG. 2), and a guide member 51c is freely and rotatably attached to the back ends of the elongated support plates 46c, 47c by pins 73c. The guide members 50a and 51b or 50b and 51c in each of the joint sections are fixed in such a way that their rotation axes cross each other. Therefore, the arms 43 and 44 or 44 and 45 can move relative to each other in each of the joint sections, taking the axes X1-X2 and Y1-Y2 as their rotational axes.

A driving means for driving the guide member 51b, which consist of a motor 52a, a reduction gear 53a, a joint 54a, a worm 55a, a worm wheel 56a and a spur wheel 57a, is so arranged on the support member 43a within the arm 43 as to transmit the rotation of the motor 52a to the guide member 51b. Similarly, a driving means for driving the guide member 50a and consisting of means for driving the guide member 50a and consisting of a motor 58b, a reduction gear 59b, a joint, (not shown), a worm 60b, a worm wheel 61b and a spur wheel 62b, and another driving means for driving the guide member 51c and consisting of a motor 52b, a reduction gear 53b, a joint 54b, a worm 55b, a worm wheel 56b and a spur wheel 57b are arranged on the support member 44a in the arm 44. A driving means for driving the guide member 50b and consisting of a motor 58c, a reduction gear 59c, a joint (not shown), a worm 60c, a worm wheel 61c and a spur wheel 62c, is also arranged on the support member 45a within the arm 45. Due to the rotation of motors 52a and 58b, arm 44 can move in any direction, with respect to the arm 43 fixed to the base 9. Due to the rotation of motors 52b and 58c, arm 45 can also move in any direction, with respect to arm 44. The rotating angle (or rotating position) of the arm in each of the joint sections can be detected by potentiometers 63. In each of the joint sections there is arranged a limit switch to stop the rotation of motors when the relative rotating angle between the arms reaches a limit value (or maximum rocking angle). This limit switch has a sensor 64 attached to the underside of the elongated support plate 46b, for example, with its detecting direction directed vertically downward; and a fan-like indication plate 65 horizontally attached to the side of said guide member 50b or 51b.

When the multi-joint arm 11 moves within a narrow space, part of the multi-joint arm 11 may be brought into contact with an obstacle. If this occurs, the multi-joint arm 11 must be separated from the obstacle and must be moved along a safe path. For this purpose, a plurality of contact sensors are provided within each unit arm of the multi-joint arm 11, to detect which unit arm has come into contact with the obstacle and from what direction the obstacle is in contact with the detected unit arm.

Figure 3:
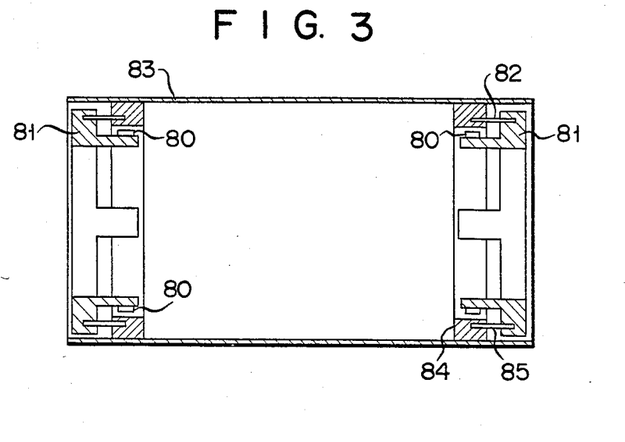
FIGS. 3 and 4 show contact sensors arranged in each unit arm of the multi-joint arm.
Figure 4:
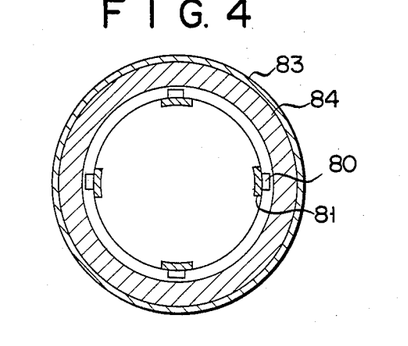

The contact sensor will now be described with reference to FIGS. 3 and 4. Reference numeral 81 denote rings fixed at both ends of, for example, the support plate 46b or 47b of FIG. 2. Sensors 80 are arranged at the end of each fixed ring 81, at equal angular intervals of 90° as shown in FIG. 4. Floating rings 84 fixed to an arm cover 83 are supported by the fixed rings 81 through spring wires 82 so as to oppose the sensors 80, respectively.

With such a construction as described above, in the normal state, the arm cover 83 and the floating rings 84 are kept by the spring wires 82 in an equilibrium state with respect to the fixing rings 81. In other words, the sensors 80 are kept OFF. However, when part of the unit arm cover 83 is brought into contact with an obstacle, a sensor in the vicinity of the contact portion is driven by the corresponding floating ring to generate a contact signal. The contact signal is supplied to the control system.

Figure 5:
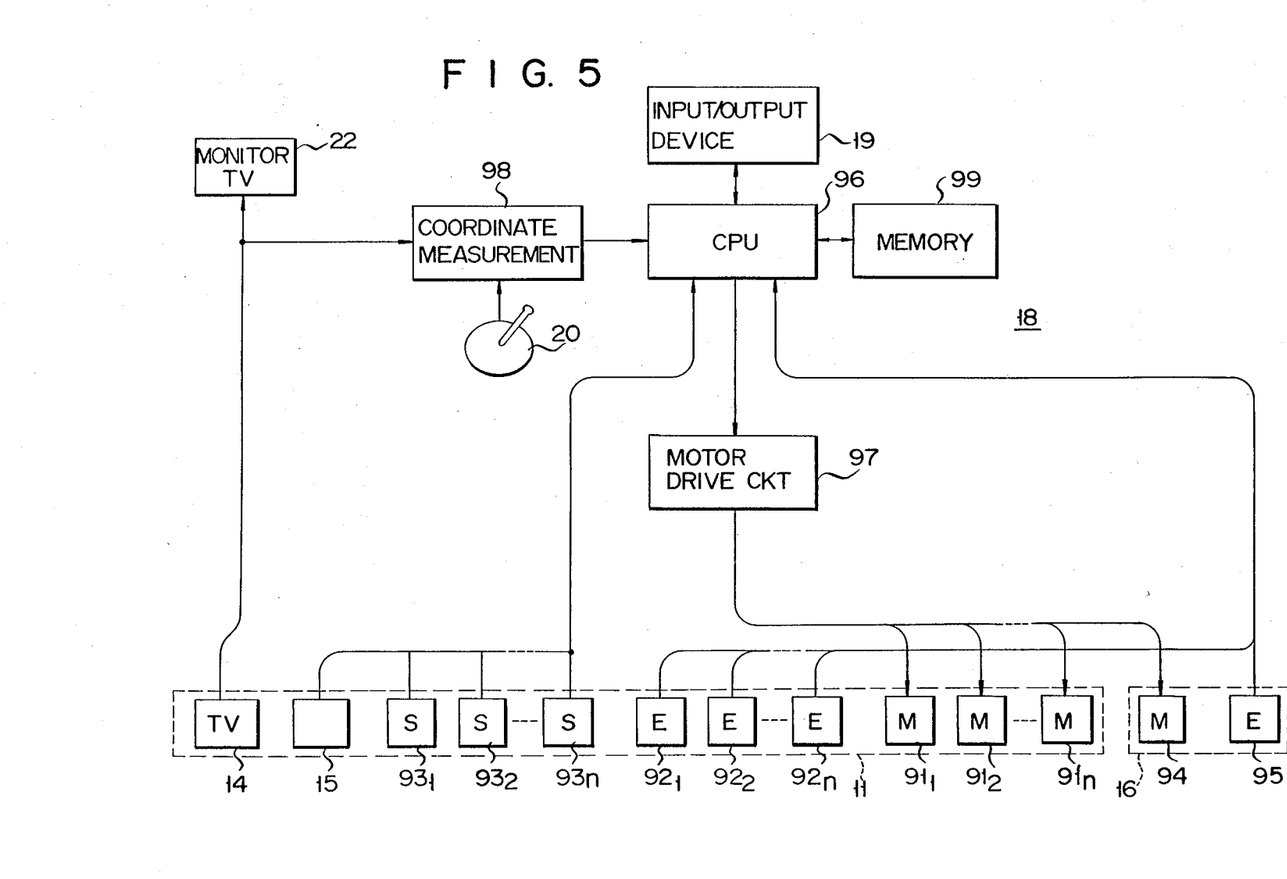
FIG. 5 is a block diagram showing a control system for controlling the multi-joint arm robot.

FIG. 5 shows a schematic configuration of the control system 18. In the figure, the like reference numerals are used to denote the like parts in FIG. 1. Motors $91_1$ to $91_n$ for driving the joints $13_1$ to $13_n$; encoders (potentiometers of FIG. 2) $92_1$ to $92_n$ for detecting the rotating angle of the joints; and contact sensors $93_1$ to $93_n$ are disposed within the multi-joint arm 11. A motor 94 for driving the support 16 and an encoder 95 for detecting the displacement of the support 16 (rotating angle of the motor 94) are disposed within the support 16. Motors $91_1$ to $91_n$ and 94 are driven by a motor drive circuit 97, in response to instruction data from a CPU 96.

Encoders $92_1$ to $92_n$ and 95, the contact sensors $93_1$ to $93_n$ and the range finder 15 are coupled to the CPU 96. The image picked up by the TV camera 14 is reproduced by the TV monitor 22. A coordinate measurement device 98 is coupled to the TV monitor 22 so as to measure coordinates of the target spot on the screen of TV monitor 22. The measured coordinate data of the target spot is applied to the CPU 96. The coordinate measurement device 98 is arranged to produce a cross-shaped cursor on the screen of the TV monitor 22, which may be moved by the joystick 20 to any position, and measure the coordinates of the cursor on the screen.

Figure 6:
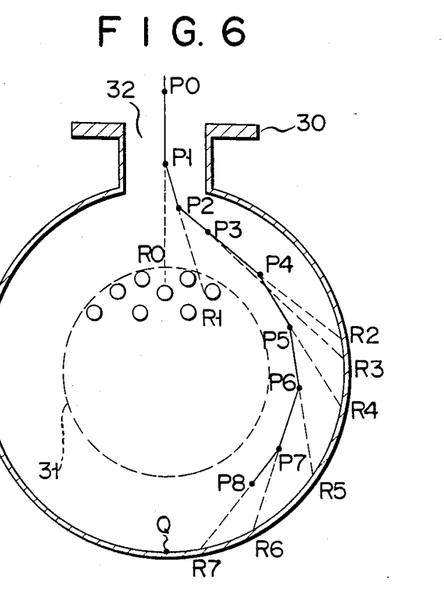
FIG. 6 is a representation for use in explaining the operation of the control system for guiding the multi-joint arm shown in FIG. 1.
Figure 7:
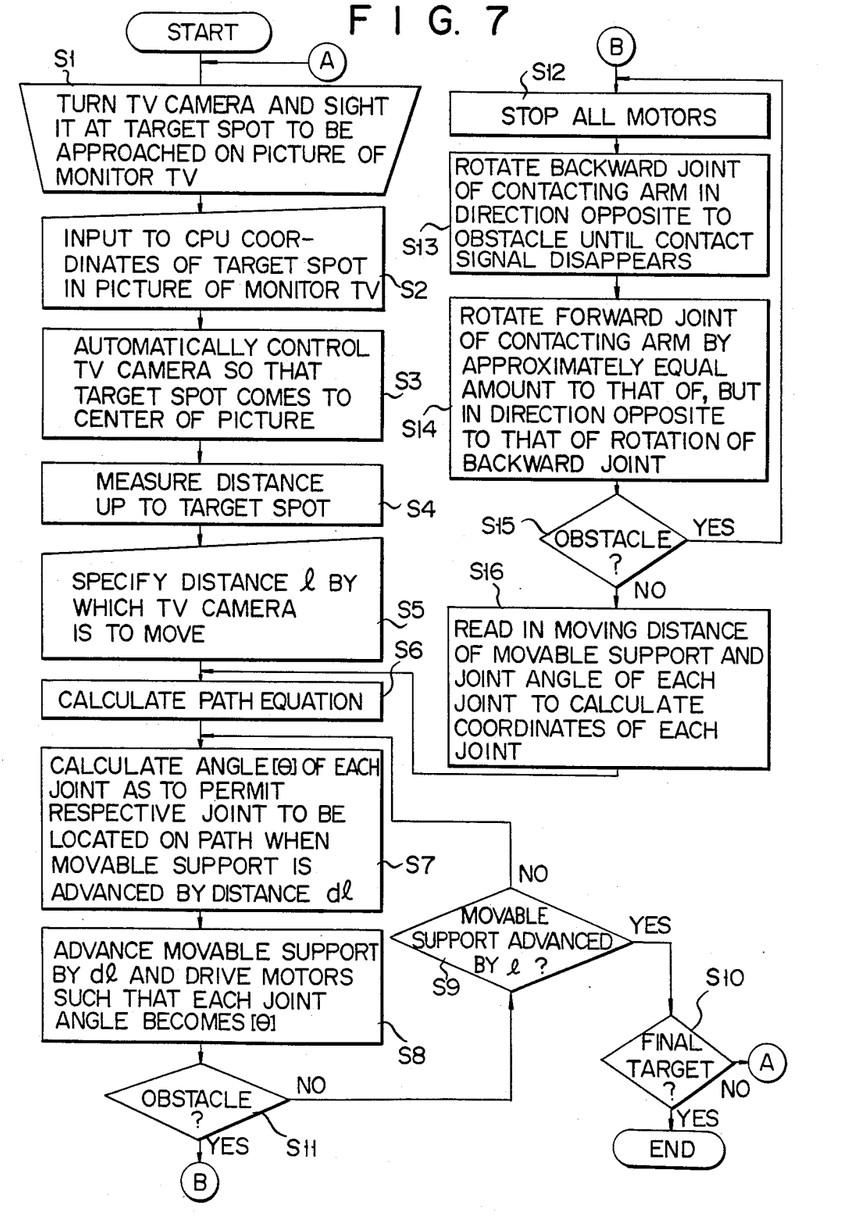
FIG. 7 is a flow chart for use in explaining the guide control operation of the control system.

The control system of the multi-joint arm robot having the TV camera and the range finder will now be described with reference to FIGS. 6 and 7. FIG. 6 shows a heat exchanger of nuclear equipment which has pipes 31 therein. Let us assume that a portion Q which cannot be directly observed from an inlet port 32 behind the pipes 31 is to be inspected.

The leading end of the multi-joint arm 11 is located at point $P_0$, so that the inside of tank 30 may be observed by the TV camera 14. The operator adjusts the viewing direction of TV camera 14 by manual operation of the joint $13_1$ while watching the screen of TV monitor 22. Then, the sight is settled on a proper target spot $R_0$ in the TV monitor screen which is to be approached by TV camera 14. The sight is set by the cross-shaped cursor on the screen of the TV monitor 22.

Once the sight is set on the target spot, the operator instructs, through the input/output device 19, the CPU 96 to read a coordinate value of the cursor on the monitor screen from coordinate measurement device 98 (step S2). When the cursor is not located at the center of the screen of TV monitor 22, such a rotation angle of the joint $13_1$ is calculated from the coordinate data of the cursor as allows the target spot to be brought to the center of the screen of the TV monitor. Then, the joint $13_1$ is rotated by the calculated angle so that the target spot $R_0$ is located at the center of the screen of the TV monitor (step S3). As a result, the TV camera 14 is accurately directed toward the target spot $R_0$. Thus, preparation was made for measuring the distance up to the target spot $R_0$.

The range finder 15 automatically measures the distance up to the target spot $R_0$ (step S4). The range finder 15 may consist of an optical or ultrasonic type range finder which is used in automatic focusing cameras. The measured distance data is automatically read by the CPU 96 to be displayed on the display 21.

The operator judges how far the TV camera 14 is to be moved toward the target spot $R_0$, in accordance with the measured distance and the picture on the IV monitor 22. Then, the operator specifies a distance l and enters the distance data ( into the CPU 96 through the input/output device 19 (step S5).

The CPU 96 calculates an equation (path equation) representing a path along which the multi-joint arm must advance, in accordance with information so far obtained and stored in a memory 99 (step S6). Referring to FIG. 6, when the start point is given as $P_0$, for example, an equation indicating a line connecting points $P_0$ and $P_1$ is the path equation. When the TV camera 14 is moved from point $P_1$ to point $P_2$, toward the next target spot $R_1$, an equation indicating the curve connecting points $P_0$, $P_1$ and $P_2$ is given as a path equation.

Once the path equation is found, such joint angles $[\theta]$ are calculated that the joints are located on the path represented by the path equation when the movable support 16 of the multi-joint arm 11 is moved by distance dl (step S7). The calculated values of the joint angles are stored in the memory 99. The CPU 96 instructs the motor drive circuit 97 to drive the motors, so that the movable support 16 is moved by distance dl and each of the joint angles is set to $[\theta]$ (step S8). Each time the movable support 16 is moved by distance dl, the CPU 96 checks, in step S9, whether or not the movable support 16 has been moved by distance l. When it is determined that the movable support 16 has not moved by the distance l, steps S7 and S8 are repeated. When the movable support 16 has been moved by the distance l, the CPU 96 checks in step S10 whether or not the leading end of the multi-joint arm 11 has reached the final point on the path. If NO, the CPU 96 requests the operator to specify the next target spot at the input/output device 19. As a result, the operation is repeated from step Sl. Namely, the same procedures as above are repeated in such a way that the leading end of the multi-joint arm 11 is moved to point $P_2$ for the target spot $R_1$, and to point $P_3$ for the target spot $R_2$. In this way the leading end of the multi-joint arm 11 is guided to the final point $P_8$. After the leading end has been guided to the final point $P_8$, the joint $13_1$ may be manually operated to properly turn the TV camera 14, so that point Q is located at the center of the screen of the TV monitor 22 for inspection convenience. During the guiding operation described above, data on the joint angles $[\theta]$ of the joints calculated each time the movable support 16 is moved by distance dl are successively stored in the memory 99.

In a case where there is a considerably large space, the leading end of the multi-joint arm 11 can be brought close to the target spot Q to be inspected by the above-mentioned operations. However, if there is no sufficiently large space relative to the size of the multi-joint arm, a rearward portion of the multi-joint arm may be brought into contact with an obstacle and damaged. The rearward portion of the multi-joint arm is generally designed to be thicker than the forward portion thereof in terms of its mechanical strength. For this reason, a rearward unit arm may be brought into contact with the obstacle, even if a forward unit arm or arms have avoided contact with the same obstacle.

Figure 8A:
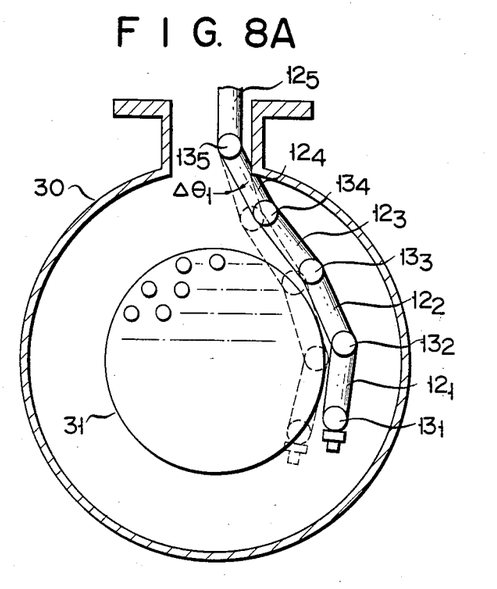
FIGS. 8A and 8B are representations for use in explaining the movement of the multi-joint arm in avoiding an obstacle.
Figure 8B:
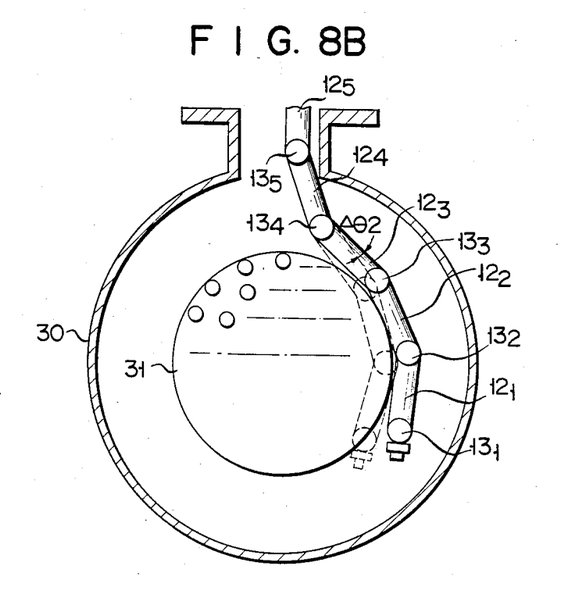

The operation for preventing the arm from coming into contact with the obstacle will be described. As previously described, a plurality of contact sensors are disposed within each of the unit arms which constitute the multi-joint arm 11. Thus, the CPU 90 can detect which unit arm and which side thereof are in contact with the obstacle. When the contact of multi-joint arm 11 with the obstacle is detected in step $S_{11}$, after the multi-joint arm 11 has been moved by distance dl in step S8, the obstacle avoiding operation is performed. Namely, in step S12, the CPU 96 stops all motors. The CPU 96 rotates the backward joint of the contacting arm in a direction opposite to the obstacle until the contact signal disappears (step S13). At the same time, the CPU 96 rotates the forward joint of the contacting arm by an amount approximately equal to, but in a direction opposite to, the rotation of the backward joint (step S14). For example, as shown in FIG. 8A, when the unit arm $12_4$ contacts the obstacle, the CPU 96 rotates the backward joint $13_5$ of the unit arm $12_4$ by an angle $\Delta\theta_1$. As shown in FIG. 8B, the forward joint $13_4$ is then rotated by an angle $\Delta\theta_2$ which has a relation given below:

$$\Delta\theta_1 = -k\Delta\theta_2$$

where k is a constant depending on a position and length of the contacting unit arm relative to the multi-joint arm. The constant k falls within a range of from 0.5 to 1.5.

After the forward and backward joints of the contacting arm are rotated as described above, the CPU 96 rechecks, to determine (in step S15) if any unit arm is in contact with the obstacle. When the obstacle avoiding operation is completed, the CPU 96 reads the position of the movable support 16 and the joint angles through the encoders $92_1$ to $92_n$ and 95 to calculate the coordinates of each joint (step S16). The operation returns to step S6 in which the CPU 96 calculates a path equation in accordance with the new coordinates of the joints to effect an automatic path correction. When the path correction is completed, the multi-joint arm is guided along the corrected path in accordance with the procedure described above.

The operation mode of the multi-joint arm is a direction designation mode in which the direction in which the arm is to be moved is designated by the operator. In this operation mode, during the forward movement of multi-joint arm, the joint angles are sequentially calculated in accordance with the path equation and stored in the memory each time the movable support is moved by the unit distance dl. For the backward movement of the multi-joint arm, the joint angles calculated during the forward movement are reversely read out of the memory to drive the joints.

In this embodiment, the TV camera and the range finder are used to specify the direction and distance in and by which the leading end of the multi-joint arm is to move. However, a stereoscopic television system can also be used. A stereoscopic TV camera unit disposed at the leading end of the multi-joint arm and a stereoscopic TV monitor may be used to specify the direction and distance of the movement of the multi-joint arm. By using two TV cameras as a stereoscopic TV camera unit and two TV monitors as a stereoscopic TV monitor unit, for example, the operator can watch a stereoscopic image with the aid of a stereoscopic mirror.

The multi-joint arm can be operated in the path designated mode instead of in the direction designated mode. In the path designated mode, a path along which the multi-joint arm advances is previously determined. The control system of the multi-joint arm in this operation mode will be described with reference to FIGS. 9 and 10. When the multi-joint arm is controlled in this operation mode, the range finder 15, the joystick 20 and the coordinate measurement device 98 of the control system shown in FIG. 5 are not required.

Figure 9:
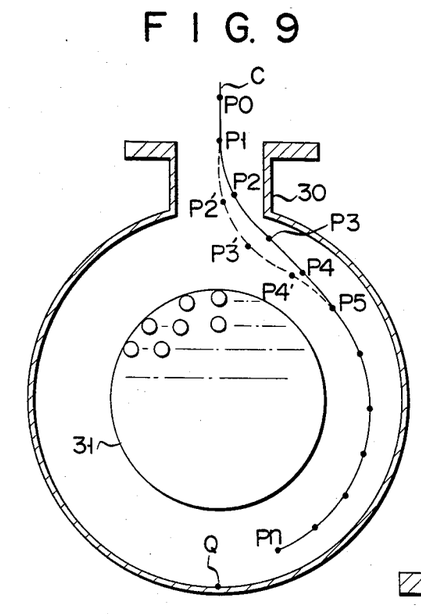
FIG. 9 is a representation for use in explaining a guide control system of a multi-joint arm robot according to another embodiment of the present invention.

As shown in FIG. 9, the operator draws an optimal path C on a drawing of the tank 30 to be inspected, divides the path C into N parts, and finds the coordinates of the dividing points ($P_0$ to $P_n$) (step S20).

Figure 10:
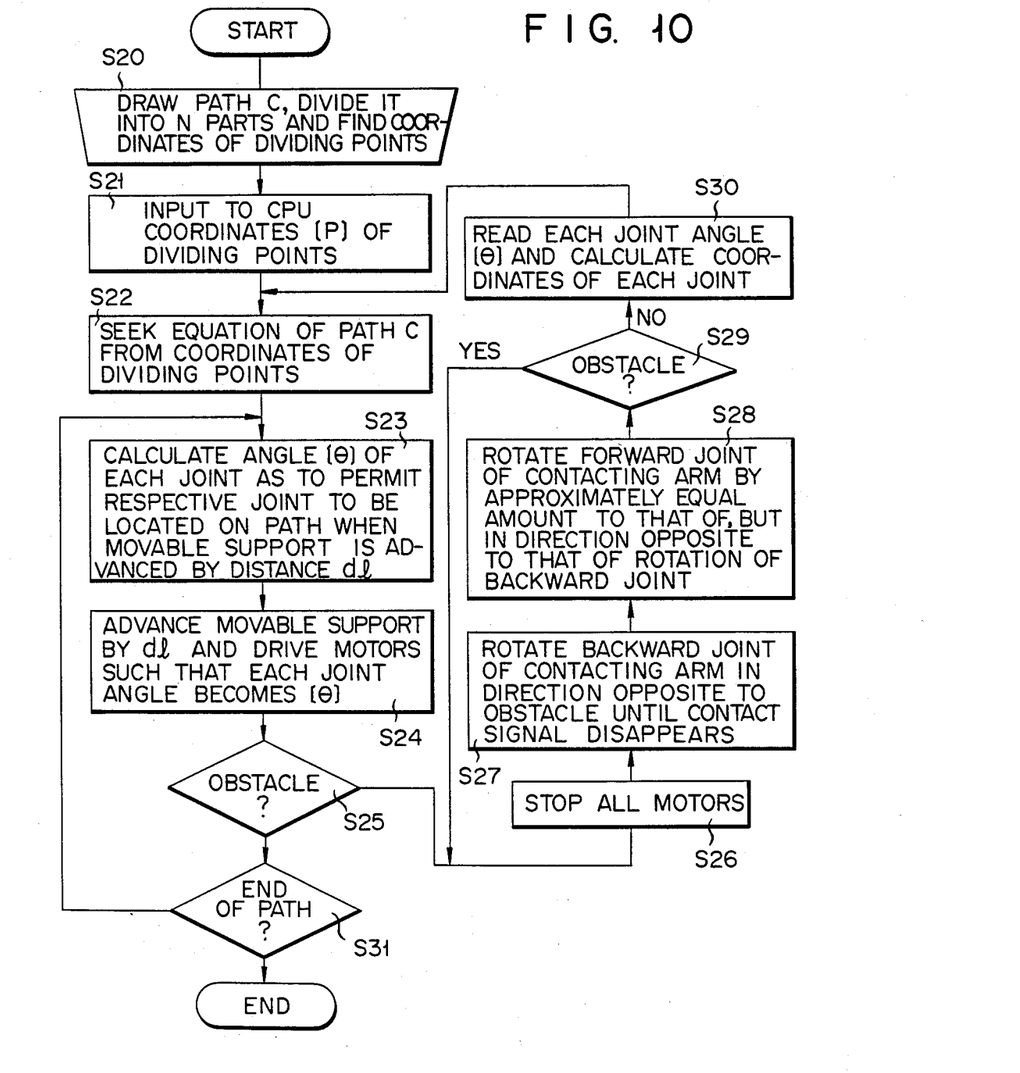
FIG. 10 is a flow chart for use in explaining the guide control system shown in FIG. 9.

The operator then enters the coordinates of the dividing points into the CPU 96 through the input/output device 19 (step S21). The CPU 96 calculates a path equation indicating the path C from the coordinates [P] of the dividing points $P_0$ to $P_n$ (step S22). From the path equation the CPU 96 calculates such a joint angle $[\theta]$ of each joint that the joints $13_1$ to $13_n$ are put into the path C when the support 16 is moved by distance dl (step S23). Once the joint angle $[\theta]$ is calculated, the CPU 96 instructs the motor drive circuit 97 to set the actual joint angle at $[\theta]$ (step S24). In this case, the movable support 16 is moved by distance dl.

In step S25, the CPU 96 checks to determine if any unit arm is in contact with an obstacle. For example, as shown in FIG. 9, if an arm comes into contact with an obstacle at a portion between points $P_2$ and $P_3$, then the operator enters into CPU 96 the coordinates of points $P'_2$ to $P'_4$ in place of points $P_2$ and $P_4$, in order to correct the path. Alternatively, the same operation (steps S26 and S27) as in the direction designated mode is performed. When the CPU 96 determines that no portion of the multi-joint arm is in contact with the obstacle, the CPU 96 reads data indicating the joint angles $[\theta]$ and the displacement or travel distance of the movable support 16 and calculates the coordinates of the joints (step S30). The CPU 96 corrects a portion of the path C along which the multi-joint arm has been moved by using the coordinates (step S22). By repeating the operations (steps S23 and S24) to control the joint angle of each joint so that each joint moves on the corrected path each time the support 16 is moved by distance dl along the corrected path, the multi-joint arm 11 is allowed to reach the final point Pn while avoiding obstacles.

To return the multi-joint arm to the original position, it is required that the data obtained each time the movable support advances by distance dl, and sequentially stored in the memory during the forward movement of the arm be read out from the memory in reverse order.

Figure 11:
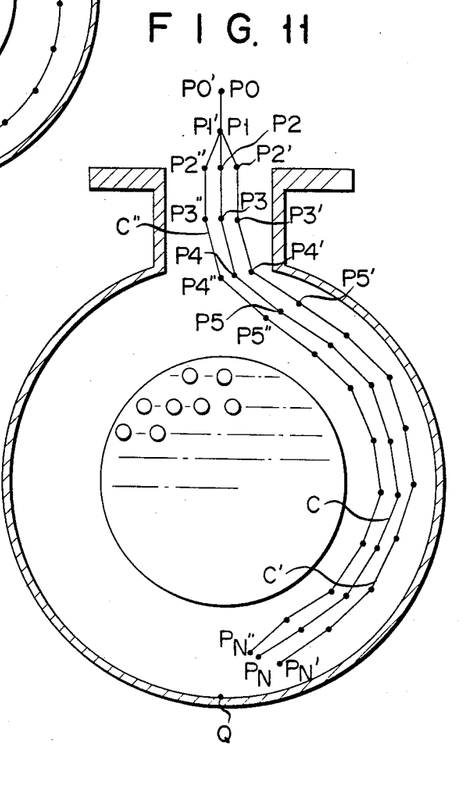
FIG. 11 is a representation for use in explaining the guide control system according to still another embodiment of the present invention.

Another operation for preventing the arm from contacting an obstacle in the path designated mode will be described with reference to FIG. 11. The operator specifies a plurality of auxiliary paths C' and C" in addition to the optimal path C, and divides the auxiliary paths C' and C" to obtain the coordinates of dividing points $P'_0$ to $P'_n$ and $P''_0$ to $P''_n$, respectively, in the same manner as for the optimal path C. The CPU 96 calculates a path equation from the coordinates of the dividing points for each of the paths and joint angles $[\theta]$ such that the joints are put into the corresponding path when the support 16 is moved by distance dl. The data indicating the joint angles $[\theta]$ for allowing proper movement of the multi-joint arm along the corresponding path are stored in the memory.

The CPU causes the multi-joint arm to move along the optimal path C, as previously described. If any one of the outermost pipes of the pipes 31 is broken and happens to come into contact with the multi-joint arm, the CPU 96 selects an optimal path from among the auxiliary paths C', C", to avoid contact with the obstacle. Thereafter, the selected path is used to perform the forward and backward movement of the arm.

Figure 12:
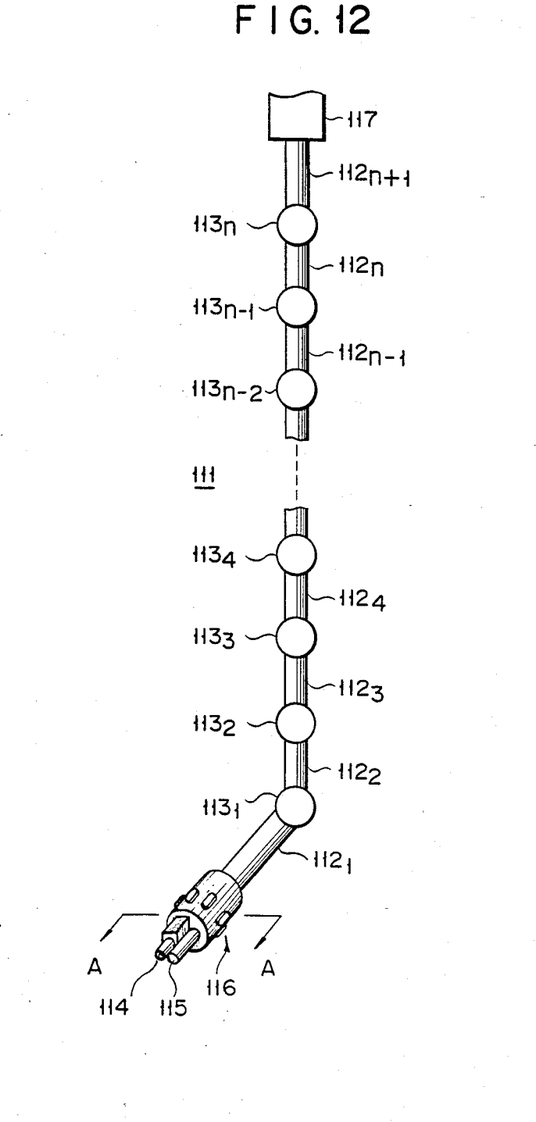
FIG. 12 shows a multi-joint arm robot operated by a guide control system according to still another embodiment of the present invention.

Still another embodiment of the present invention will be described hereinafter. As shown in FIG. 12, a TV camera 114, a range finder 115 for measuring a forward distance, and a range finder 116 ($116_1$ to $116_8$) for measuring side distances are disposed at a leading unit arm $112_1$ of a multi-joint arm 111. Therefore, distances from the leading end of the arm to an obstacle and from the side of the arm to an obstacle can be measured. In accordance with the measured distance data, the multi-joint arm is automatically moved toward a target spot to be inspected without contacting any obstacle.

Figure 13:
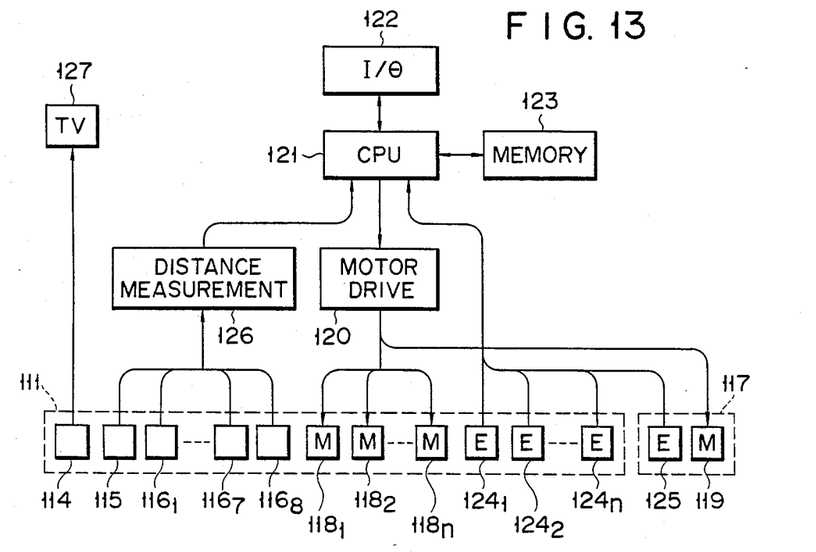
FIG. 13 shows a control system of the multi-joint arm robot shown in FIG. 12.

A control system of this multi-joint arm is shown in FIG. 13. The control system comprises a motor drive circuit 120 for driving motors $118_1$ to $118_n$ arranged in the multi-joint arm 111 to rotate joints $113_1$ to $113_n$, and a motor 119 for moving a movable support 117; a CPU 121 for controlling the motor drive circuit 120; an input/output device 122 of the CPU 121; and a memory 123. The joint angle data of the joints $113_1$ to $113_n$ are applied to CPU 121 through encoders arranged in the respective joints. The rotation angle of the motor 119 (displacement of the support 117) is applied to CPU 121 through an encoder in the movable support 117. Distance data from the range finder 115 and the range finder 116 comprising the range finders $116_1$ to $116_8$ arranged at angular intervals of 45° are sequentially supplied to the CPU 121 through a distance measurement device 126. The image picked up by the TV camera 114 is reproduced on a TV monitor 127.

Figure 14:
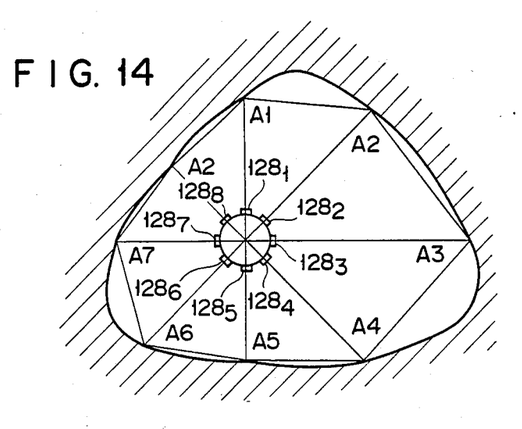
FIG. 14 shows a side obstacle profile measured by the multi-joint arm robot shown in FIG. 12.

Range finders 115 and 116 are comprised of ultrasonic range finders. As shown in FIG. 14, range finder 116 comprises ultrasonic elements $128_1$ to $128_8$ which are so arranged along the periphery of the unit arm $112_1$, at equal angular intervals of 45°, as to radially measure distances $A_1$ to $A_8$ up to obstacles in the eight directions on the plane normal to the axis of arm $112_1$.

Figure 15:
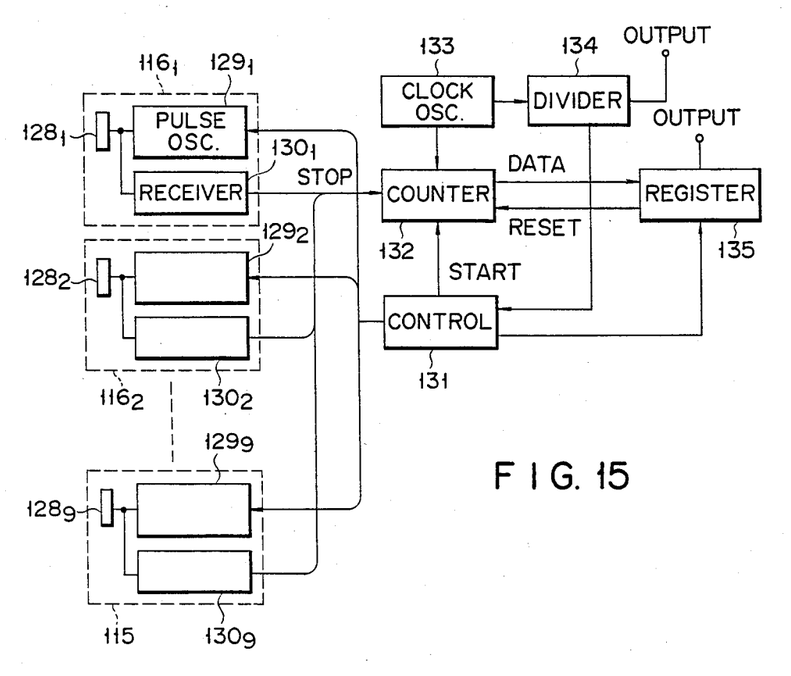
FIG. 15 is a block diagram of the range finder shown in FIG. 13.

The distance measurement device 126 has a configuration shown in FIG. 15. The side range finders $116_1$ to $116_8$ and forward range finder 115 have pulse oscillators $129_1$ to $129_9$ for applying pulses to ultrasonic elements $128_1$ to $128_9$ in a time-division manner. The ultrasonic element generates an ultrasonic wave in response to application of a pulse thereto. The range finders $116_1$ to $116_8$ and 115 comprise receivers $130_1$ to $130_9$, respectively, for receiving the ultrasonic wave reflected by an obstacle. The pulse oscillators $129_1$ to $129_9$ are sequentially enabled by a control circuit 131 to oscillate. A counter 132 counts clock pulses of a predetermined period from a clock oscillator 133. The counter 132 is enabled by a start signal from the control circuit 131 to count the clock pulses, and disabled by an output signal of each of the receivers $130_1$ to $130_9$. A frequency divider 134 divides the frequency of the clock pulse from the clock oscillator 133. An output of the divider 134 is coupled to the control circuit 131, to determine oscillation start time of each of the oscillators $129_1$ to $129_9$. A count of the counter 132 which corresponds to distance up to the obstacle measured by one of the range finders $116_1$ to $116_8$ and 115 is loaded into a register 135. Thereafter, the counter 132 is reset. The register 135 is controlled by the control circuit 131 to serially supply the measured data from range finders $116_1$ to $116_8$ and 115 to the CPU 121. The output of divider 134 is coupled to CPU 121 to represent the measuring order of the range finders $116_1$ to $116_8$ and 115.

Figure 16:
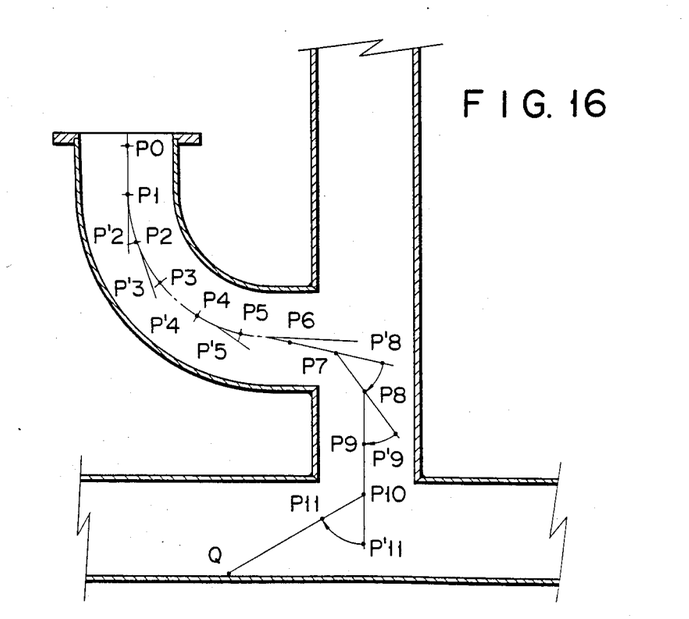
FIG. 16 is a representation for use in explaining the guide control operation of the multi-joint arm robot shown in FIG. 12.

The operation of the multi-joint arm shown in FIG. 12 will be described by taking an example of inspection of the inside of a bent pipe as shown in FIG. 16.

The operator guides the leading end of the arm to point $P_0$. In this case, if the manual operation mode is set, the operator can easily position the leading end at point $P_0$, while he observes the image picked up by the TV camera 114 and the obstacle profile around the arm based on the data from the side range finder 116. When the leading end is positioned at point $P_0$, the automatic operation mode is set. For illustrative convenience, let us assume that the unit arms of the multi-joint arm are of an equal length l and that the arm is moved forward or backward by one unit arm length during one control cycle.

Figure 17:
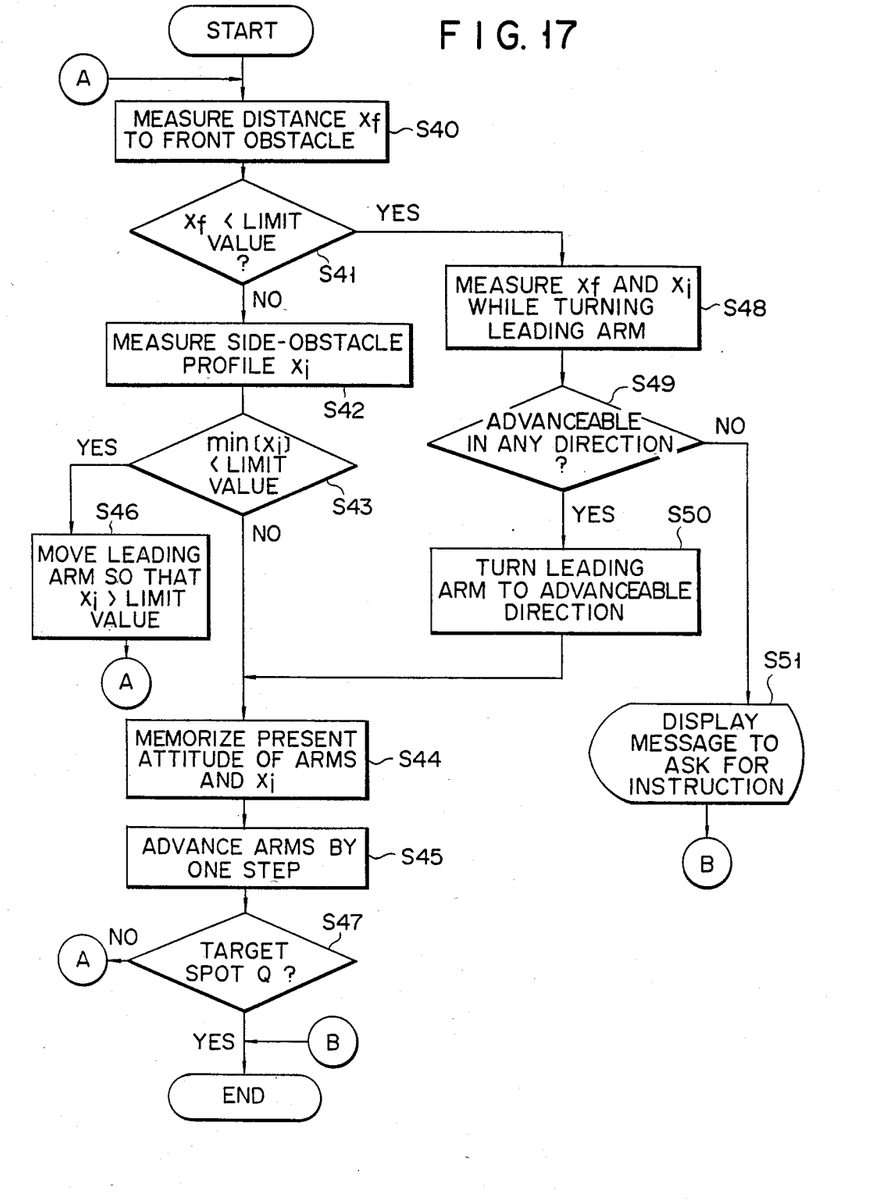
FIG. 17 is a flow chart for use in explaining the guide control operation of the multi-joint arm robot shown in FIG. 12.

As shown in FIG. 17, the distance $X_f$ up to a front obstacle is measured in step S40. In step S41, the CPU checks to determine if the distance $X_f$ falls below a limit value. If NO in step S41, distances $X_i$ up to side obstacles are measured in step S42. It is then checked in step S43 if the minimum value among the values measured by the eight side range finders falls below the limit value. If NO in step S43, the present attitude of arms (joint angles) and the side distances $X_i$ are stored in the memory 123 in step S44. In step S45, the CPU 121 moves the movable support 117 and the multi-joint arm 111 by one step. The operation performed during steps S40 to 45 is repeated so long as the forward distance and the side distances do not fall below the limit value. As a result, the multi-joint arm is guided to point $P_{11}$ at which the target spot Q in the pipe of FIG. 16 can be inspected.

For example, when the leading end of the arm is located at point $P_0$ in FIG. 16, since no front obstacle is found and the leading end of the arm is located at the center of the side obstacle profile, the leading end of the arm advances by distance l to reach point $P_1$. At this time, the joint $113_1$ is located at point $P_0$. The joint angle of the joint $113_1$ is stored in the memory 123. Since the condition of the front obstacle and side obstacle profile at point $P_1$ may be considered to be the same as that at point $P_0$, the leading end of the arm can advance by distance l to reach point $P'_2$. At this time, joints $113_1$ and $113_2$ reach points $P_1$ and $P_0$, respectively. If, at point $P'_2$, the minimum side distance to an obstacle is less than the limit value, then the joint $113_1$ is rotated in such a way that the leading end of the arm comes to point $P_2$ in step S46 of FIG. 17. The present joint angle of the joint $113_1$ at point $P_1$ is stored in the memory 123. Subsequently, the leading end of the arm advances to point $P'_3$. As a result, joints $113_1$, $113_2$ and $113_3$ come to points $P_2$, $P_1$ and $P_0$, respectively. If the condition at point $P'_3$ is the same as that at point $P'_2$, then leading end of the arm is moved from point $P'_3$ to point $P_3$. The joint angle of the joint $113_1$ at point $P_2$ is stored in the memory 123. During the above operation, when the joint is moved from a point to the next point, each joint is controlled to have the joint angle which the predecessor joint has had.

The CPU checks, in step S47, to determine whether or not the leading end of the arm has reached a position from which the target spot Q can be inspected. If NO in step S47, the above control cycle is repeated until the leading end reaches a position from which the target spot Q can be inspected. However, if YES in step S41, the leading end arm $112_1$ is turned and distances $X_f$ and $X_i$ are measured in step S48. In step S49, the CPU checks to determine whether or not the leading end can be advanced in any direction. If YES in step S49, the leading arm is turned to the advancable direction in step S50. In step S45, the arm is advanced by one step. If NO in step S49, a message is displayed to ask for an instruction of the operator in step S51.

In the above-mentioned operation, the joints are controlled in such a way that each joint tracks a point that the predecessor joint has passed, after a delay of one control cycle, thereby greatly simplifying the control system.

The limit value of forward distance $X_f$ is preset to be longer than length l. Taking into consideration the focal length of the TV camera 114, it is desired that the distance $X_f$ can be externally set. The limit value of the side distance must be externally preset since the arm thickness, the length l and the scope of a space through which the arm passes must be considered.

Referring to FIG. 16, the forward movement of the leading end from point $P_7$ to $P'_8$, and its turning movement from points $P'_{11}$ to $P_{11}$ require the operator's judgment. However, the operator can know in advance the object to be inspected, from the drawing thereof. In addition to this, the operator can observe the picture on the TV screen, so that an operator's burden is very light.

In the above embodiments, the multi-joint arm is described as inspection apparatus having a TV camera. However, it will be evident that if a torque wrench, a gripper, a magnet chuck or the like is mounted at the leading end, a simple work such as tightening of nuts or withdrawal of loose parts will be performed.

What is claimed is:

1. In a control system for a multi-joint arm robot apparatus including a multi-joint arm having a plurality of unit arms coupled in tandem with each other through joints, said multi-joint arm having first actuating means for controlling a joint angle of each of said joints, first detecting means for detecting the joint angle of each of said joints; a movable support for supporting a base arm of said multi-joint arm; and contact sensor means for detecting which unit arm is in contact with an obstacle to generate a contact signal, said movable support having second actuating means for moving said movable support so as to move said multi-joint arm, and second detecting means for detecting the distance by which said movable support moves;

said control system comprising:
means coupled to a foremost unit arm of said multi-joint arm for measuring the direction and distance in and by which said multi-joint arm is to be moved;

data processing means responsive to said measuring means, said first detecting means and said second detecting means for computing joint angles of said joints such that said joints are put into a path represented by measured distance and direction data obtained by said measuring means when said movable support is moved by a unit distance by said second actuating means; and driving means responsive to said data processing means for actuating said second actuating means to move said movable support by the unit distance and actuating said first actuating means of said multi-joint arm in such a way that said joints are set to joint angles computed by said data processing means, said data processing means being responsive to the contact signal generated by said contact sensor means to cause said driving means to rotate the rearward joint of a unit arm of said multi-joint arm, which is in contact with the obstacle, until the contact signal disappears, and then rotate the forward joint of said contacting unit arm in a direction opposite to the rotating direction of said rearward joint through substantially the same amount.

2. A system according to claim 1, wherein said means for measuring the direction and distance comprises: a television camera mounted on the leading end of said multi-joint arm, and a range finder for providing distance data; a monitor receiver connected to said television camera; and means connected to said monitor receiver for specifying the direction in which the leading end of said multi-joint arm to be moved on the screen of said monitor receiver.

3. A system according to claim 1, wherein said means for measuring the direction and distance comprises: a stereoscopic television camera mounted on the leading end of said multi-joint arm; stereoscopic display means connected to said stereoscopic television camera; and means connected to said stereoscopic display means for specifying the direction in which said multi-joint arm to be moved on the screen of said stereoscopic display means, and measuring the distance to a target spot in the specified direction.

* * * * *